July 27, 1965 W. L. HOWLAND 3,196,679
FLUID NO-FLOW DETECTION APPARATUS
Filed May 22, 1962 5 Sheets-Sheet 1

INVENTOR.
WALTER L. HOWLAND
BY George C. Sullivan
Agent

July 27, 1965
W. L. HOWLAND
3,196,679
FLUID NO-FLOW DETECTION APPARATUS
Filed May 22, 1962
5 Sheets-Sheet 2
FIG. 3
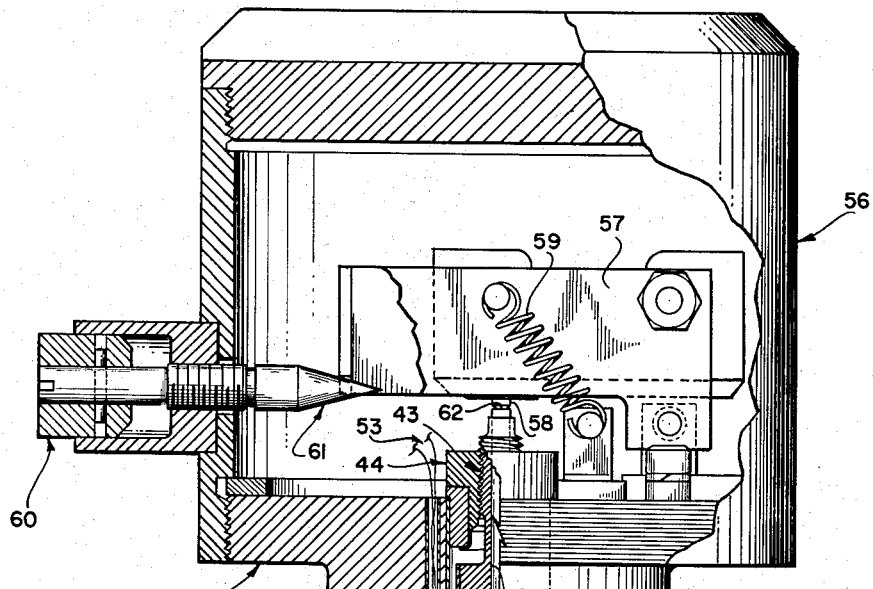
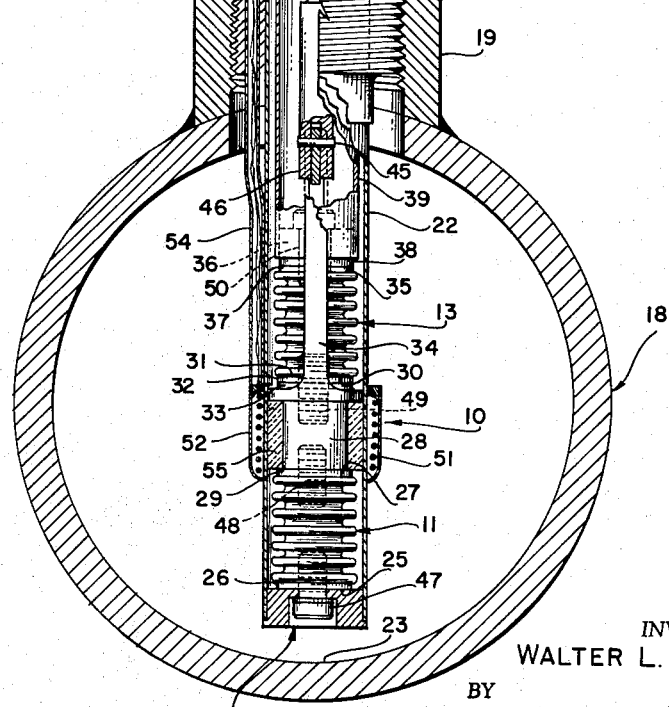
INVENTOR.
WALTER L. HOWLAND
BY
*George C. Sullivan*
Agent

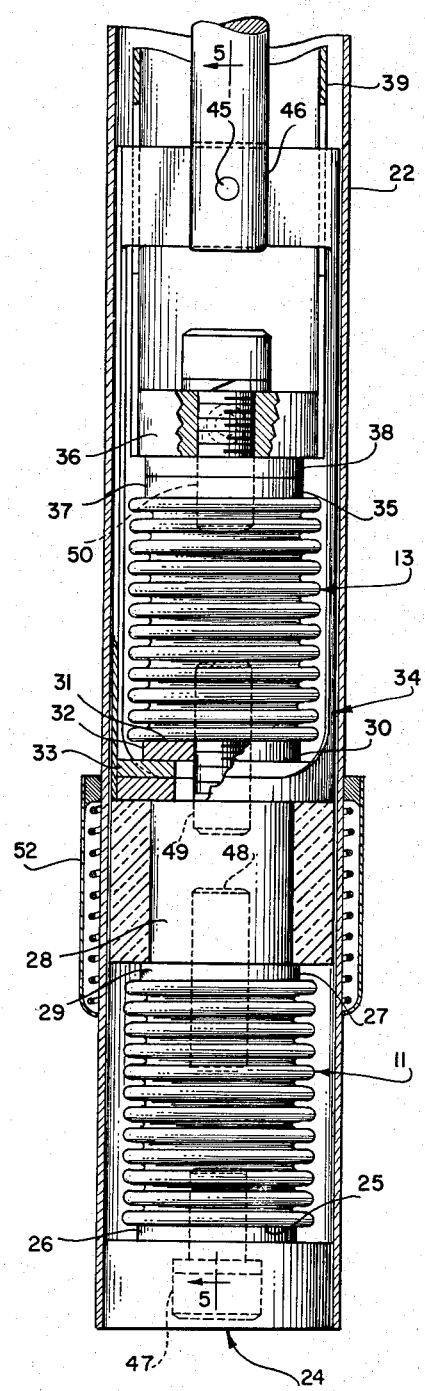
FIG_4
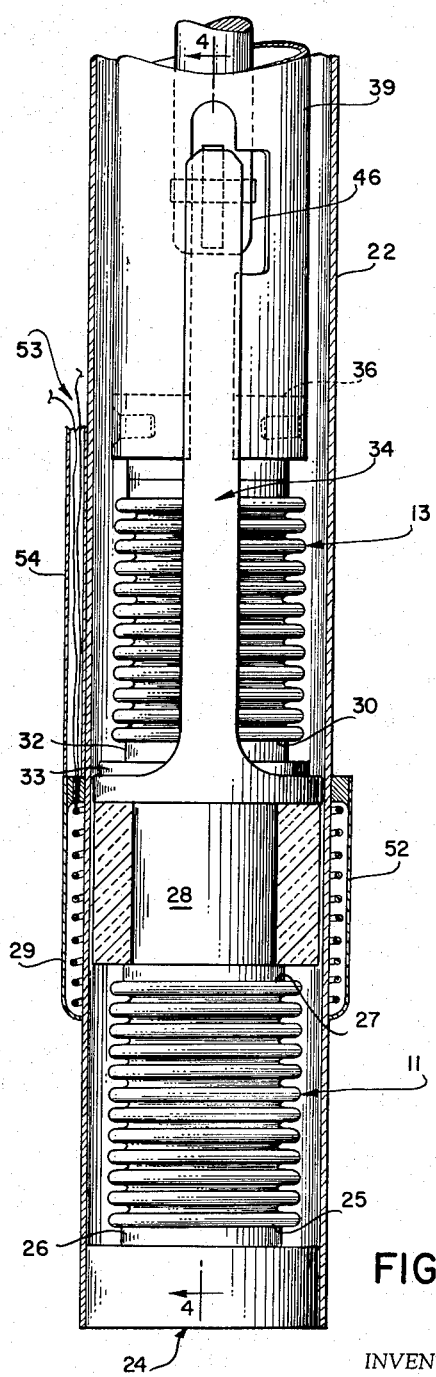
FIG_5
INVENTOR.
WALTER L. HOWLAND
BY George C. Sullivan
Agent

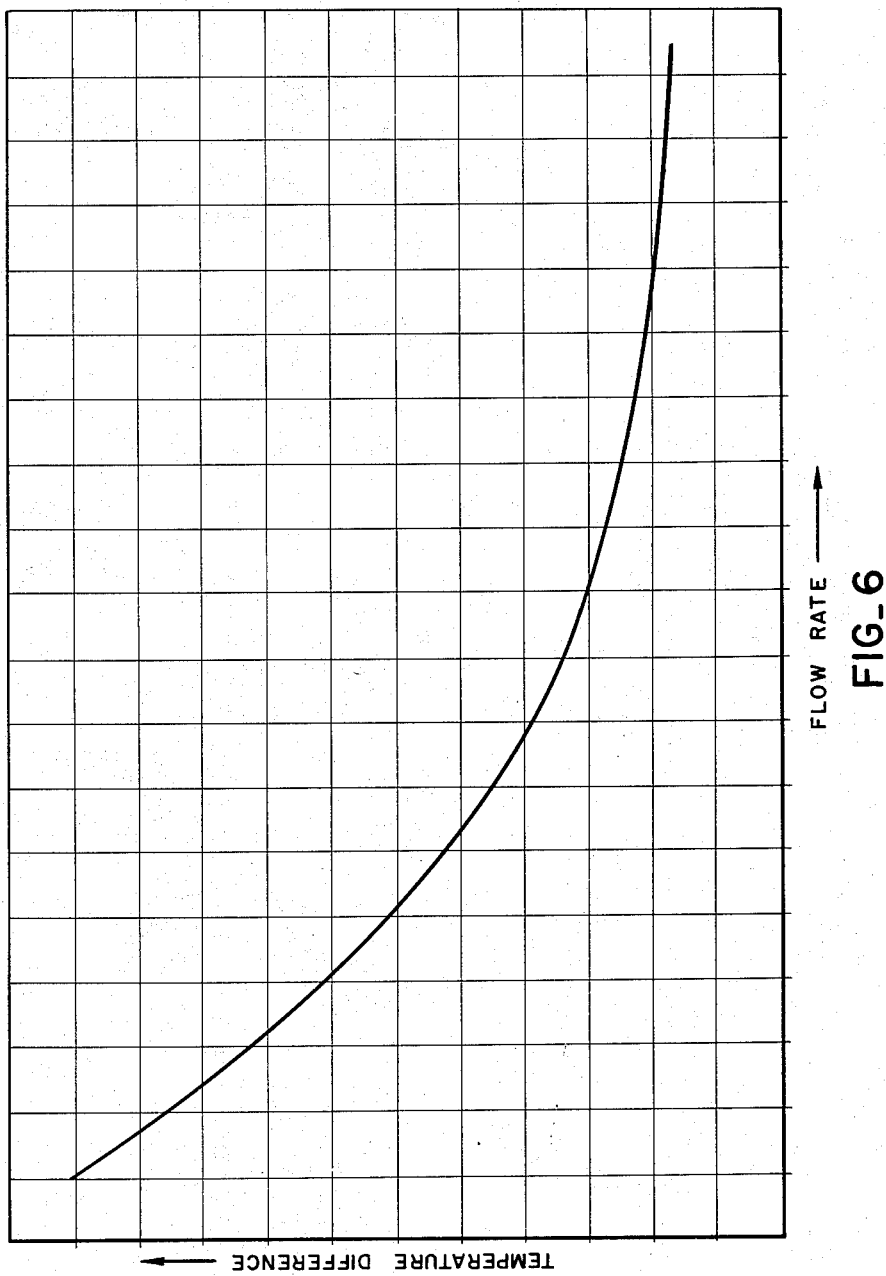

United States Patent Office 3,196,679
Patented July 27, 1965

3,196,679
FLUID NO-FLOW DETECTION APPARATUS
Walter L. Howland, Burbank, Calif., assignor to Lockheed Aircraft Corporation, Burbank, Calif.
Filed May 22, 1962, Ser. No. 196,638
7 Claims. (Cl. 73—204)

The present invention relates to fluid no-flow detectors and, more specifically, to apparatus for insertion into a fluid medium flowing through a conduit for detection of a no-flow condition of the fluid.

There are many industrial applications requiring reliable indications of when the flow of fluid in a pipeline ceases. By way of example only, and not limited thereto, the present application particularly describes a specific embodiment of the present invention for the detection of flow conditions of the material in an oil pipeline during the pumping operation from an oil well to a settling tank.

There are several basic methods and types of apparatus for generally sensing fluid flow such as, for example, a vane position, heat flow, sonic velocity measurements, nuclear radiation or isotope flow, and pressure differential across an orifice or venturi. For various reasons, the techniques and apparatus for detecting normal ranges of rate and/or volume of fluid flow are not applicable to the detection of the stoppage of such flow, particularly when the fluid is crude oil coming directly from the oil well. One of the difficulties arises from the fact that the material coming from an oil well is generally a mixture of oil and water. In addition, the flow from some pumping wells is fluctuating in nature and frequently intermittent. Further, some crude oil is so viscous as to have a consistency similar to that of molasses. It is desired that reliable indications be given at some central location in an oil field when a particular well stops producing during pumping operations so corrective action can be taken.

Accordingly, the primary objects of the present invention are the provision of apparatus for detecting a fluid no-flow condition.

More specific objects of the present invention are the provision of apparatus for detecting a fluid no-flow condition of crude oil in a pipeline during the pumping operation.

Additional specific objects of the present invention include the provision of apparatus for detection of fluid no-flow conditions with automatic compensation for variations in viscosity, composition and ambient temperature of the fluid material, normal ranges of fluctuation in flow rate and volume, and predetermined allowable intermittency of flow.

According to the method of the present invention, heat is applied to the fluid in the conduit in a relatively localized region, one of the results of which is that the amount of heat transferred to a given quantity of fluid is a function of the rate of flow of such fluid; the temperature of such quantity of fluid is sensed, directly or indirectly, in a region relatively adjacent to the heat injection region in a manner to produce an output which also is a function of the rate of flow of such quantity of liquid, the normal or ambient temperature of fluid which is relatively unaffected by such heat injection is sensed to produce an output for comparison with the first output; and the two sensed outputs are combined or otherwise compared to produce a differential output which is a function of that portion of the added amount of heat which is sensed by subsequent transfer from the heated quantity of fluid. Thus, the greater the rate of flow of the fluid, the lower the amount of heat transferred to a given quantity of fluid and, consequently, the less will the temperature of such quantity of fluid be raised, whereby the differential output sensed therefrom will be within normal ranges of flow indications; if the flow slows, the amount of heat transferred to such given quantity of fluid will be increased, with consequent increase of temperature of such fluid and the sensed output corresponding thereto. In a preferred embodiment of the present invention, the vertically rising heat convection characteristic of the fluid is utilized so that the temperature of such quantity of fluid is sensed indirectly and produces important values of sensed heat during very slow flow conditions. In the particularly preferred embodiment of the present invention adapted for detection of no-flow conditions in crude oil being pumped from an oil well, the sensing of the temperature of the heated quantity of fluid is damped to compensate for both normal fluctuations in the fluid flow rate due to the pumping action and also normally expected intermittent stoppage of fluid flow for short periods of time.

According to the apparatus aspects of the present invention, there is provided detector apparatus adapted to be disposed within a fluid medium for detecting a flow condition thereof including first and second heat sensors in spaced relationship within such medium, each of the sensors producing a respective output corresponding to the temperature of that portion of the fluid immediately adjacent thereto, heater means disposed between the sensors and effectively communicating with such fluid medium for transferring heat thereto, and means responsive to at least one predetermined difference of such outputs corresponding to a predetermined flow condition. In one embodiment of the present invention, the heat sensors and the heater means are disposed in effectively vertical alignment within a horizontally flowing fluid so that, under normal flow conditions, both of the sensors will sense the temperature of unheated fluid, but whereby, under no-flow conditions, the temperature of the fluid adjacent to the upper sensor will rise due to the heat convection from the heated quantity of fluid adjacent to the heater means below such upper sensor, such utilization of the heat convection principle causing an averaging or integrating effect with respect to detection of flow or no-flow conditions. In the preferred embodiment specifically adapted for detecting no-flow conditions in crude oil flowing through a pipeline from the oil well during the pumping operation, the averaging or integrating function is additionally emphasized by utilization of bellows-type heat sensing elements containing an expendable fluid which requires a relatively large quantity of heat for actuation thereof or, differently stated, such elements have a large absorbed-heat-to-movement ratio characteristic.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

FIGURE 3 is an elevational view, partly in vertical section and partly broken away, of a preferred embodiment of the present invention;

FIGURE 4 is an enlarged view of the sensor portion of the invention shown in FIGURE 3 taken in the direction of arrows 4—4 of FIGURE 5;

FIGURE 5 is an enlarged view of the sensor portion taken in the direction of arrows 5—5 of FIGURE 4;

FIGURE 6 is a graph showing temperature difference versus flow rate; and

Figure 1:
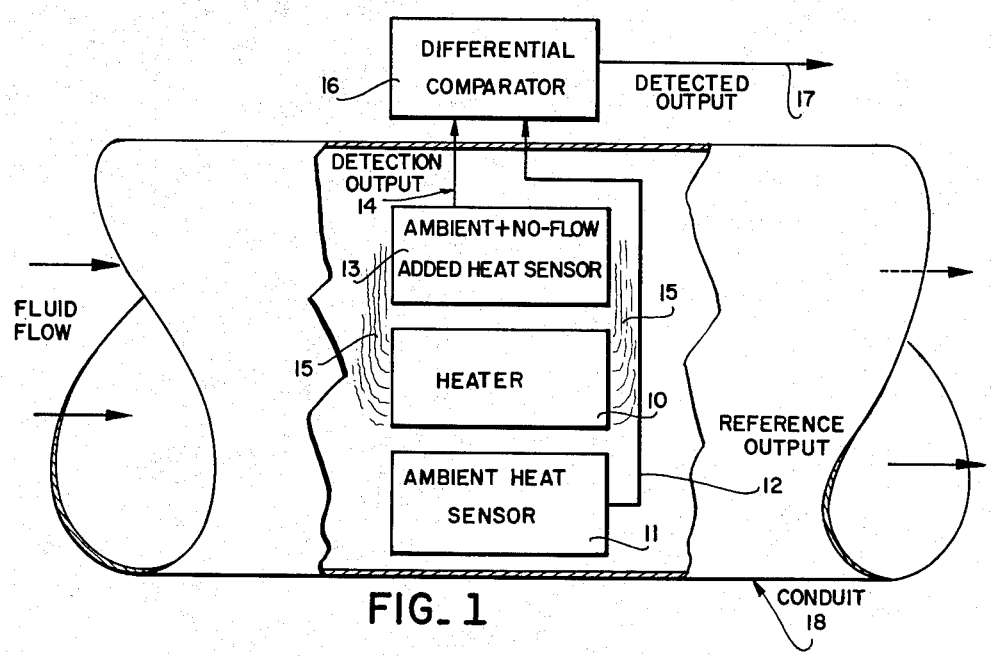
FIGURE 1 is a diagrammatic illustration, primarily in block form, of a preferred method in accordance with the present invention.

Referring to FIGURE 1, there is seen a heater 10 located within the flowing fluid for continuously adding heat by radiation, conduction and/or any other convenient method to the fluid flowing thereby in the direction indicated. Located below the heater 10, or in any other location within the fluid so as to be relatively unaffected by the heat added by such heater, is an ambient heat sensor 11 detecting the normal temperature of the fluid to provide a heat reference output 12. A second heat sensor 13 is disposed within the flowing fluid in a location above the heater 10 and in substantially vertical alignment therewith so as to provide a detection output 14 corresponding to the combination of both the ambient temperature of the fluid and that portion of the added heat sensed by the sensor 13 due to the convection heat, generally indicated at 15, transferred to the fluid adjacent to the sensor 13 from the fluid adjacent to the heater 10. The reference output 12 and detection output 14 are illustrated as being fed to a differential comparator 16 for producing a detected output 17 proportional to the instantaneous difference in magnitude of the reference output 12 and the detection output 14. It should be understood that the various outputs 12, 14 and/or 17 may be either or a combination of an electrical, mechanical, hydraulic or any other convenient form of output depending on the various factors involved in the particular application. Although the invention is illustrated as being applied to fluid flowing in one direction through a conduit 18 of the pipe type, it should be noted that the detection system illustrated may be applied to the fluid flowing in any lateral direction in any form or shape of conduit or container. During "normal flow" conditions which, for the purposes of this application, may be defined as the flowing of fluid at a rate in excess of any arbitrarily predetermined rate of flow, the latter being referred to herein as the "no-flow" condition (which includes all lower flow rates as well as the arbitrary threshold rate), the portion of the fluid flowing past the heater 10 will absorb heat from such heater at the constant rate of emission therefrom and, therefore, any given quantity of fluid will contain an amount of heat which is a function of the rate of flow of such fluid. During such normal flow conditions, the heated fluid moves downstream from the heater 10 and the heat sensor 13 so that the latter is relatively unaffected by such added heat and will produce an output 14 substantially equal to the reference output 12, i.e., corresponding to the ambient temperature of the unheated fluid flowing through the conduit 18. However, during no-flow conditions, the quantity of fluid adjacent to the heat sensor 13 becomes heated by the convection current 15 from the heated quantity of liquid adjacent to the heater 10. The heat sensor 13 may be of a type having a low heat storage capacity so as to be immediately responsive to the temperature of the fluid adjacent thereto; in such case, the detected output 17 similarly will provide immediate indication of the occurrence of a no-flow condition so that, if the no-flow condition is of normal duration due to normal flow rate fluctuations or even stoppage, a time delay means may be required in the system to prevent undesired no-flow signal indications. According to the preferred method and apparatus of the present invention, the heat sensor 13 has a relatively large heat storage capacity so that the liquid adjacent thereto must be heated by the convection currents 15 for a relatively long period of time before its output 14 attains sufficient magnitude to provide the predetermined no-flow condition signal of the detected output 17. Although the temperatures of the quantities of fluid adjacent to both of the heat sensors 11 and 13 may be raised slightly because of conduction heat from the quantity of fluid adjacent the heater 10, such conduction heat is relatively slight compared to the convection heat transferred to the fluid adjacent the upper heat sensor 13 and, thus, will have little or no effect on the sensitivity of the differential detected output 17; in addition, the conduction heat effect will be similar to the ambient heat and will be balanced in the outputs 12 and 14, particularly if the heat sensors 11 and 13 are equally spaced from the heater 10.

Figure 2:
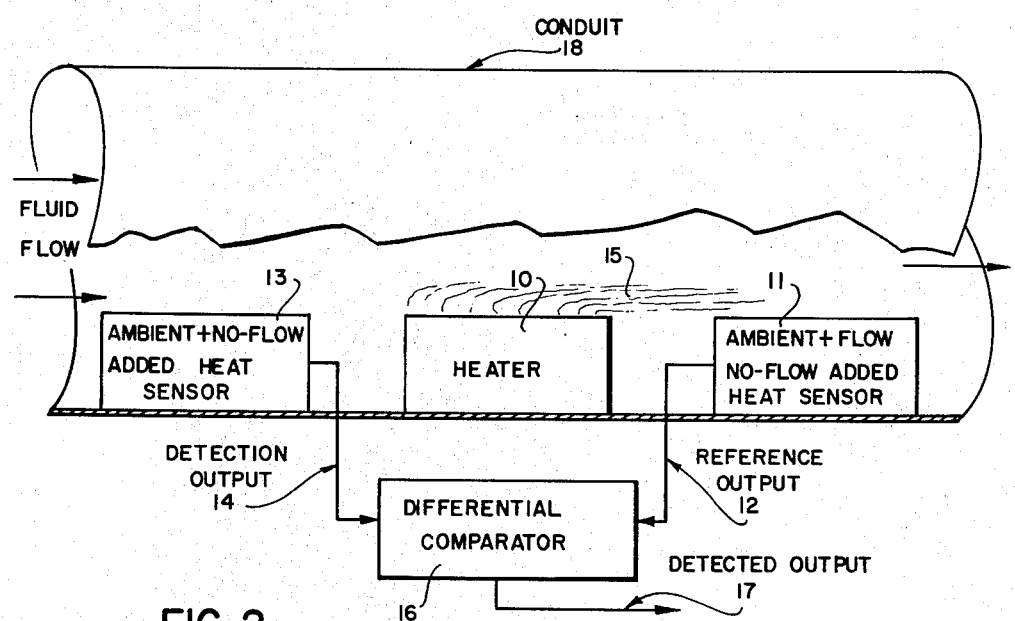
FIGURE 2 is a diagrammatic illustration, primarily in block form, of another method of the present invention.

Referring to FIGURE 2, in which the previous reference numerals are applied to the same or similar elements and/or functions, the heater 10 is located between but on the same horizontal level with the two heat sensors 11 and 13 within the conduit 18 so that, under normal conditions of fluid flow in the direction indicated, substantially the same portion of the fluid flows successively over the three elements. During such normal fluid flow conditions, the upstream heat sensor 13 is not affected by the heat added to the fluid as it passes the heater 10 and, therefore, produces a detection output 14 corresponding to only the ambient temperature of the fluid. The downstream heat sensor 11, unlike its counterpart in the system illustrated in FIGURE 1, is responsive to the heat in the fluid that has been heated during its adjacency to the heater 10 and, therefore, produces a reference output 12 of greater magnitude than the output 14 of the sensor 13 (assuming identical characteristics for the two heat sensors 11 and 13). Under no-flow conditions, the fluid adjacent the heater 10 remains relatively immobile and heat transfer occurs from such quantity of fluid in both lateral directions at substantially equal rates due to the mechanism of heat conduction (rather than the convection of FIGURE 1) until the reference output 12 and the detection output 14 attain substantially the same magnitude so that the detected output 17 from the differential comparator 16 becomes substantially zero or some other predetermined low threshold magnitude for indicating the continued occurrence of a no-flow condition. It now should be clear to those skilled in the art that any predetermined no-flow condition threshold or alarm level for the detected output 17 may be preselected for any type of fluid and/or flow rate and/or volume factors by selection of the system parameters such as, for example, size and capacity of the heater 10, heat storage capacity of the heat sensors 11 and 13, spacing of the sensors 11 and 13 with respect to the heater 10, and so forth.

Referring to FIGURE 3, there is seen a preferred embodiment of the present invention operable in accordance with the principles described in connection with FIGURE 1 and particularly useful for the detection of no-flow conditions of the oil-bearing fluid in a pipeline during the pumping operation from an oil well to a settling tank. A substantially horizontal pipeline 18, which may be the usual existing type with a 3" diameter, is provided with a vertically extending pipe boss 19 which is internally threaded for receiving an externally threaded nipple 20 in sealing engagement. The nipple 20 is integrally formed with a block 21 for mounting the detection apparatus. A hollow cylindrical tube 22 is secured at its upper end to the mounting block 21 and extends vertically downward into the fluid (not shown) in the pipeline 18 adjacent to the inner bottom surface 23 of the latter. A plug 24 seals the bottom end of the tube 22. A heat sensor 11 of the bellows type has its bottom end 25 in abutment against the plug 24 by means of a washer 26. The top end 27 of the head sensor 11 abuts against a cylindrical spacer block 28 by means of another washer 29. The other heat sensor 13 has its bottom end effectively in abutment against the block 28 by means of a washer 31, a heat insulating washer 32, and a ring portion 33 of an output member 34. Thus, the ends 27 and 30 of their respective heat sensors 11 and 13 are in effective abutment against each other, the spacer blocks 28 merely providing for spatial separation of the heat sensors 11 and 13 for obvious reasons. The top end 35 of the heat sensor 13 abuts against a member 36 by means of washers 37 and 38. The member 36 is a plug in the end of a cylindrical tube 39 coaxial with the outer tube 22 and provided with an upper end member 40 having a central vertical bore 31 for slidably receiving an output rod 42. The upper member 40 is externally threaded at 43 for vertical adjustment with respect to an internally threaded plug 44 which is effectively secured to the mounting block 21. The output rod 42 is connected to the output member 34 by a pin 45 through a yoke 46 integrally formed with the ring portion 33 of the output member 34. The heat sensors 11 and 13 and the spacer block 28 are provided with the respective axially aligned recesses illustrated for receiving the pins 47, 48, 49 and 50 to maintain axial alignment of such elements. In the preferred embodiment illustrated, the heat sensors 11 and 13 operate on the principle of vapor pressure and may contain, for example, ethyl chloride ($C_2H_5Cl$) because of its desirable vapor pressure characteristics in response to heat absorption.

The heater 10 comprises a heater coil 51 wrapped around the exterior surface of the outer tube 22 and enclosed with a cylindrical case 52. Wires 53 are connected to the heater coil 51 and extend through a tube 54 for connection to a source (not shown) of electrical energy. The block 28 is provided with an insulation coat 55 for substantially eliminating direct heat transfer from the heater coil 51 to the heat sensors 11 and 13 by conduction through the block 28. Similarly, the tube 22 is composed of a poor heat conductor material, such as stainless steel, to both minimize the heat conduction by the tube 22 to the regions of the sensors 11 and 13 from the heater coil 51 and also provide a damping function for the heat transfer from the surrounding fluid through the tube 22 to such heat sensors 11 and 13. The heater casing 52 is composed of any desired material having high heat conductivity characteristics so as to maximize the heat transfer from the heater 10 to the fluid adjacent hereto.

A housing 56 is threadably secured to the mounting member 21 and encloses a switch, indicated generally at 57. The switch 57 is shown to be of the microswitch type and is provided internally with any desired number of contacts (not shown) for actuation by movement of the button 58. The switch 57 is pivotally mounted and provided with a spring 59 for urging the switch 57 in a downward direction. The housing 56 is provided with an adjustment screw member 60 having a conically tapered end 61 movable inwardly and outwardly with respect to the switch 57 for adjusting the downward position thereof and, therefore, presetting the actuation positions of the switch button 58 with respect to the output rod 42.

The apparatus illustrated in FIGURE 3 operates in the following manner. Oil-bearing fluid passing through the pipeline 18 contacts the casing 52 of the heater 10 and is heated thereby. During normal flow conditions, such heated fluid passes downstream and does not abnormally affect the temperature of the fluid adjacent those portions of the outer tube 22 surrounding the heat sensors 11 and 13 so that both of such heat sensors exert substantially the same bucking forces against the block 28. During no-flow conditions, the fluid heated by the heater 10 remains substantially stationary, and convection currents from such body of fluid rise to heat the fluid adjacent the upper heat sensor 13. Heat is transferred by conduction through the outer tube 22 to the heat sensor 13 from the fluid adjacent thereto, causing increased vapor pressure therewithin to tend to cause axial extension of such sensor in the downward direction in accordance with its bellows action. The fluid adjacent the lower heat sensor 11 being unaffected by such convection currents, the heat sensor 11 continues to exert an upward force on the block 28 corresponding substantially to the ambient temperature of the normally flowing fluid. Hence, the block 28 will move downwardly so as to balance the bucking forces exerted by the heat sensors 11 and 13. In so doing, the block 28 permits the heat sensor 13 to move the output member 34 downwardly by means of its ring portion 33 so as to move the end 62 of the output rod 42 away from the switch 57. Of course, the switch button 58 moves correspondingly downward for actuation of the switch contacts whereby a remote alarm and/or recording system of any desired type is actuated.

To make initial setting adjustments for predetermined no-flow condition actuation, the adjustment means (comprising elements 40, 39 and 36) is lowered by screwing the upper end member 40 into the plug 44 until the heat sensors 11 and 13 are pre-loaded between the bottom end member 36 of the adjustment means and the outer tube plug 24. Then, the switch adjustment screw 60 is set so that the desired predetermined downward movement or movements of the output rod 42 will cause sufficient movement of the switch button 58 for actuation of the switch. It should be noted that the switch 57 may be provided with a plurality of contacts, particularly of the "break" type, for successive actuation by continued downward deflection of the switch button 58 in response to discrete positions of the output rod 42 corresponding to a plurality of differential output levels of the heat sensors 11 and 13, thus providing a plurality of sequential output signals in response to a plurality of predetermined levels of no-flow conditions.

A protective thermostat may be disposed above the heat sensor 13 or in any other convenient location and coupled into the heater circuit for opening same in case too long a duration of a no-flow condition causes excessive heating of the unit. Of course, such thermostat is not operable within the desired ranges of operation of the apparatus and merely prevents damage without affecting operational signals. If desired, the heater 10 itself may be of a self-compensating type.

Clearly, the operation of the apparatus in accordance with those aspects of the present invention relating to the creation and employment of convection currents for causing successive or indirect heat transfer, depend upon the presence of a fluid medium having the characteristic of an inverse ratio of fluid density to temperature, i.e., density decreases with increased temperature so that a heated particle or molecule becomes buoyant and rises within the fluid medium. Oil performs in that manner at all temperatures of interest. Water, however, has a substantially flat density response to temperature up to about 60° F., whereupon density begins to decrease sharply with increased temperature. Since most crude oil-bearing fluids coming from an oil well contain varying and substantial quantities of water, it is preferable to operate the heater 10 with sufficient input wattage to raise the temperature of the fluid adjacent to the heater to 70° or 80° F., for example, at the maximum flow rates of detection interest. In determining parameters, it also should be noted that the specific heat of water is about four times that of oil, so that the "running" temperature of the heater 10 during normal flow conditions will be lower in the presence of an oil or oil-and-water medium. In some applications, it may be desirable to vary the amount of injected heat, by either predetermined fixed or automatically varied parameters, in accordance with the factors of viscosity, rate of flow, composition of fluid materials, and so forth, bearing in mind that sensitivity is a function of heater energy input.

In this application, reference has been made to "ambient" and "normal" fluid temperatures and to the sensing thereof during both normal and no-flow fluid conditions. As additional factors for consideration in connection with the application of the present invention to the detection of no-flow conditions in an oil pipeline, it may be noted that low pressure pipelines of 3" diameter may have a mass rate of only about seven or eight gallons of fluid an hour as a maximum, with an arbitrary no-flow threshold of about one gallon per hour. Obviously, under such conditions, some heat transfer will occur from the heated fluid to the sensor-adjacent fluid by both the conduction and convection mechanisms during normal as well as no-flow conditions. As an example only, apparatus of the type illustrated in FIGURE 3, operating under such and below-noted conditions, has supplied the following data: with an oil-and-water fluid mixture, and a heater running temperature of about 180° F., the lower and upper heat sensors 11 and 13 have run at about respectively 20° F. and 30° F. above the ambient fluid temperature, providing a substantially constant normal flow differential of about 10° F.; under no-flow conditions, the temperature differential has risen to about 40° F., and no-flow detection has reliably occurred with sensitivity of less than one gallon per hour, with output sensitivity of less than 1° F. using stainless steel bellows-type sensors.

Figure 7:
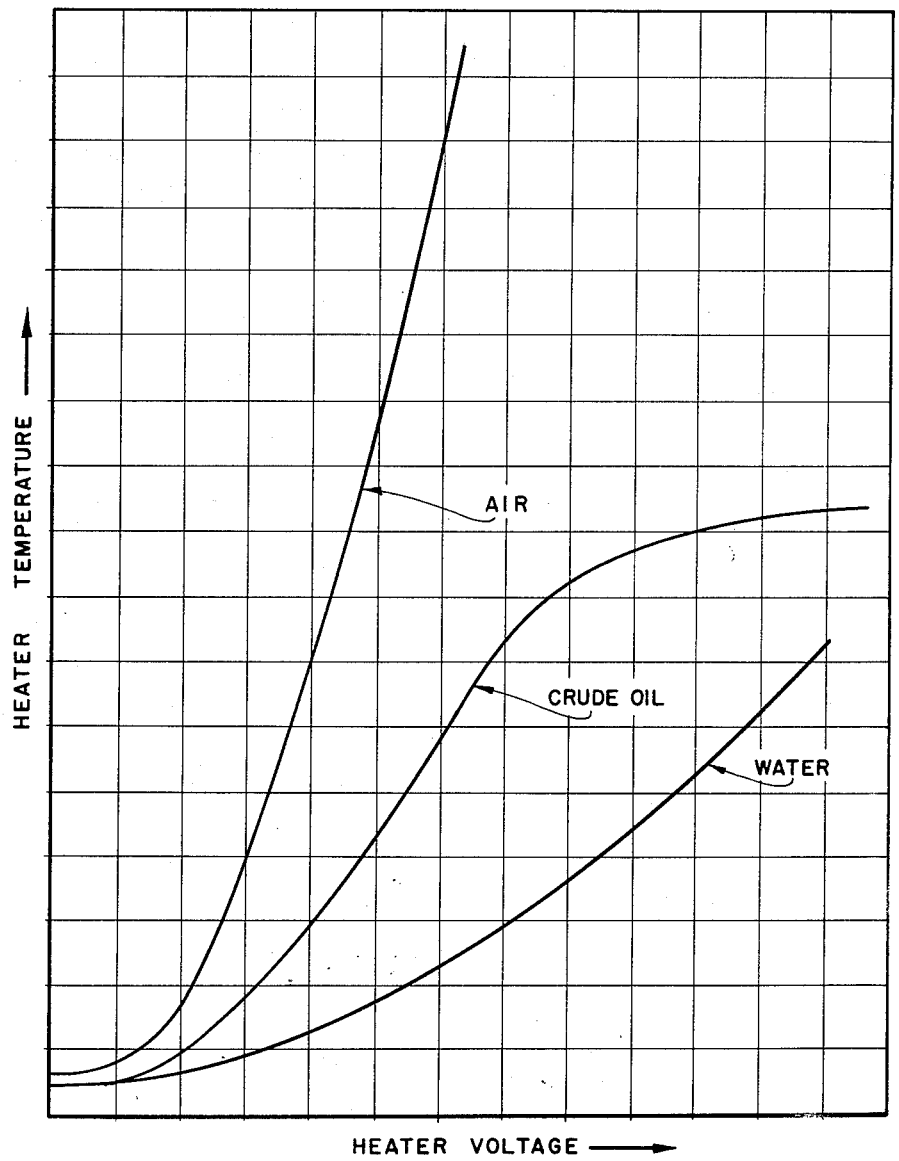
FIGURE 7 is a graph showing heater temperature versus heater voltage for changes in composition of the fluid medium.

Referring to FIGURES 6 and 7, there are shown representative performance characteristics graphs to generally illustrate the nature of various effects. FIGURE 6 shows the increase and variation in rate of increase in the temperature differential between the fluids adjacent to the upper and lower sensors as the fluid flow rate decreases (to the left). FIGURE 7 shows the effect upon the "running" temperature of the heater of variations in the composition of the fluid medium; note that the crude oil curve levels off due to the inclusion of sufficient water to cause local steaming.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. Detector apparatus adapted to be disposed within a fluid medium for detecting a flow condition thereof, comprising:
   (a) first and second heat sensors differently coupled in spaced relationship within such medium to produce a differential output movement corresponding to the difference in temperature of such fluid medium respectively adjacent thereto; and
   (b) heater means disposed between said sensors and effectively exposed to such fluid medium for transferring heat thereto.

2. Detector apparatus adapted to be disposed within a fluid medium for detecting a flow condition thereof, comprising:
   (a) first and second heat sensors in spaced relationship within such medium for producing differential outputs corresponding to the differences in temperature of such fluid medium respectively adjacent thereto; and
   (b) heater means disposed between said sensors and effectively exposed to such fluid medium for transferring heat thereto; one of said heat sensors being located relative to the flow of fluid substantially directly above said heater means whereby said one sensor senses heat transferred by convection currents to its respective adjacent fluid medium primarily only during no-flow conditions.

3. Detector apparatus adapted to be disposed within a fluid medium for detecting a flow condition thereof, comprising:
   (a) first and second heat sensors mechanically coupled in spaced relationship within such medium for producing differential outputs corresponding to the differences in temperature of such fluid medium respectively adjacent thereto; and
   (b) heater means disposed between said sensors and effectively exposed to such fluid medium for transferring heat thereto; one of said heat sensors being located relative to the flow of fluid above said heater means whereby said one sensor senses heat transferred to its respective adjacent fluid medium by heat convection currents from such fluid medium heated by said heater means.

4. Detector apparatus adapted to be disposed within a fluid medium for detecting a flow condition thereof, comprising:
   (a) heater means for continuously transferring heat to such fluid medium in a localized region;
   (b) first and second heat sensors spaced oppositely with respect to such localized region, said sensors being mechanically coupled to produce a differential output corresponding to the difference in the temperatures of such fluid medium in respective first and second regions adjacent thereto; and
   (c) said heater means and sensors being located in-line in a directional generally normal to the flow of said fluid medium whereby predetermined no-flow conditions of such fluid medium cause predetermined differences in the transfer of heat from such localized region to said first and second regions.

5. Detector apparatus adapted to be disposed within a fluid medium for detecting a flow condition thereof, comprising:
   (a) heater means for continuously transferring heat to such fluid medium in a localized region;
   (b) first and second heat sensors spaced oppositely with respect to such localized region, said sensors being coupled to produce a differential output corresponding to the difference in the temperatures of such fluid medium in respective first and second regions adjacent thereto; and
   (c) said first region being located relative to the flow of fluid above said localized region whereby heat is transferred to said fluid medium in said first region by heat convection currents from said fluid medium in said localized region.

6. Detector apparatus adapted to be disposed vertically within a fluid medium for detecting a flow condition thereof, comprising:
   (a) a cylindrical tube composed of a poor heat conductive material;
   (b) heater means circumferentially encompassing said tube at one portion thereof for continuously transferring heat to fluid in a localized region;
   (c) first and second heat sensors disposed within said tube respectively above and below said heater means for producing respective first and second outputs in response to the temperatures of respective fluid adjacent to said tube circumferentially of said sensors; and
   (d) output means effectively coupled to said sensors for producing a differential output responsive to said first and second outputs.

7. Detector apparatus adapted to be disposed vertically within a fluid medium for detecting a flow condition thereof, comprising:
   (a) a cylindrical tube composed of a poor heat conductive material;
   (b) heater means circumferentially encompassing said tube at one portion thereof for continuously transferring heat to fluid in a localized region;
   (c) first and second heat sensors, each comprising a vapor-filled bellows disposed within said tube axially respectively above and below said heater means and effectively coupled in bucking relationship; and
   (d) output means effectively coupled to said sensors for producing axial movement responsive to the differential output of said sensors.

References Cited by the Examiner
UNITED STATES PATENTS

| | | | |
|---|---|---|---|
| 1,156,638 | 10/15 | Simmons | 73—204 |
| 2,728,225 | 12/55 | Skibitzke | 73—204 |
| 2,777,325 | 1/57 | Groenhof et al. | 73—204 |

RICHARD C. QUEISSER, *Primary Examiner.*

ROBERT L. EVANS, *Examiner.*